United States Patent [19]

Jourdain et al.

[11] 4,409,791

[45] Oct. 18, 1983

[54] INJECTION DEVICE FOR THE COMBUSTION CHAMBER OF TURBINE ENGINES

[75] Inventors: Gérard E. A. Jourdain, Saintry sur Seine; Marcel R. Soligny, Chevilly-Larue, both of France

[73] Assignee: Societe Nationale d'Etude et de Construction de Moteurs d'Aviation, "S.N.E.L.M.A.", Paris, France

[21] Appl. No.: 212,748

[22] Filed: Dec. 4, 1980

[30] Foreign Application Priority Data

Dec. 13, 1979 [FR] France ................................ 79 30553

[51] Int. Cl.³ .............................................. F02C 7/22
[52] U.S. Cl. ...................................... 60/740; 60/39.32
[58] Field of Search ............. 60/740, 741, 742, 39.32; 239/132.3, 397.5, 587, 588, 591

[56] References Cited

U.S. PATENT DOCUMENTS

| | | | |
|---|---|---|---|
| 2,520,751 | 8/1950 | Zucrow | 60/39.32 |
| 2,548,904 | 4/1951 | Neal et al. | 60/740 |
| 3,662,959 | 5/1972 | Sample | 239/533 |
| 4,154,056 | 5/1979 | Emory | 239/397.5 |

Primary Examiner—Louis J. Casaregola
Attorney, Agent, or Firm—Bacon & Thomas

[57] ABSTRACT

A fuel intake tube passes radially through an engine casing. It is surrounded between the casing and an injector head by a second tube attached to the casing. Guidance means and a sealing element are provided between the fuel intake tube and the second tube. The device is equipped with one or more injector heads. The guidance means consist of two elements: a cap and cylindrical projections.

2 Claims, 4 Drawing Figures

INJECTION DEVICE FOR THE COMBUSTION CHAMBER OF TURBINE ENGINES

BACKGROUND OF THE INVENTION

The invention concerns an injection device for the combustion chamber of a turbine engine and in particular a device linking the fuel intake manifold with the injector head.

The development of the performance of advanced engines rests to a great extent on increasing the compression rate and the temperature ahead of the turbine.

This imposes certain requirements at the level of the combustion chamber and in particular in relation to the placement of the injector head in the bottom of the chamber. This placement must be relatively accurate in order to obtain the homogeneous atomization of the fuel inside the chamber and uniform combustion. The injector head must therefore follow the chamber in its displacements of thermal and mechanical origin.

FR No. 2,193,141 proposes a solution consisting of mounting the injector head on the combustion chamber and passing the fuel through tubing, the end of which carries the spraying nozzle and terminates in the axis of the head, without contact with said head. The tubing is held only by its fastening to the wall of the chamber. This device, while well suited to engines of the preceding generation, is no longer adequate for the new engines, such as those defined hereinabove, wherein the distance between the fuel intake manifold and the combustion chamber is large and does allow for the sufficiently rigid mounting of the fuel line.

FR No. 1,535,882 describes a device wherein the fuel tubing is supported at its two ends: on the combustion chamber and on the outer casing. The axes of the chamber and the tubing are identical, which permits neglecting radial expansions and eliminates the need for correcting longitudinal expansions. The fuel line tubing is formed by coaxial tubular elements wherein the liquid and gaseous fuel circulate. The differences in longitudinal expansion between the tubing and the chamber are compensated by means of a device with a spherical configuration provided between the tubing and the chamber and permitting their relative displacement.

SUMMARY OF THE INVENTION

The invention concerns a device of the type described hereinabove, which traverses the casing radially in order to connect the fuel intake manifold, located on the outside of the engine casing, with the injector head mounted on the combustion chamber. The device is designed to limit the expansion of the fuel line tube so that the position of the injection head will not be appreciably altered during engine speed variations. This result is attained by the employment of a device consisting of a first tube connected with the fuel intake manifold and carrying the fuel to the injector head, a second tube approximately coaxial with the first tube and surrounding the latter approximately at the part located between the casing and the injection head, one of the ends of the second tube being attached to the casing, said tubes being arranged radially in the casing, guidance means located between the first and the second tubes, a sealing element ensuring the passage of the first tube into the casing, of at least one injection head cooperating with a cap integral with the combustion chamber by means of a spherical projection.

BRIEF DESCRIPTION OF THE DRAWINGS

The explanation and the figures given hereinbelow as examples will make it clear how the invention may be embodied.

DESCRIPTION OF THE PREFERRED EMBODIMENTS

Figure 1:
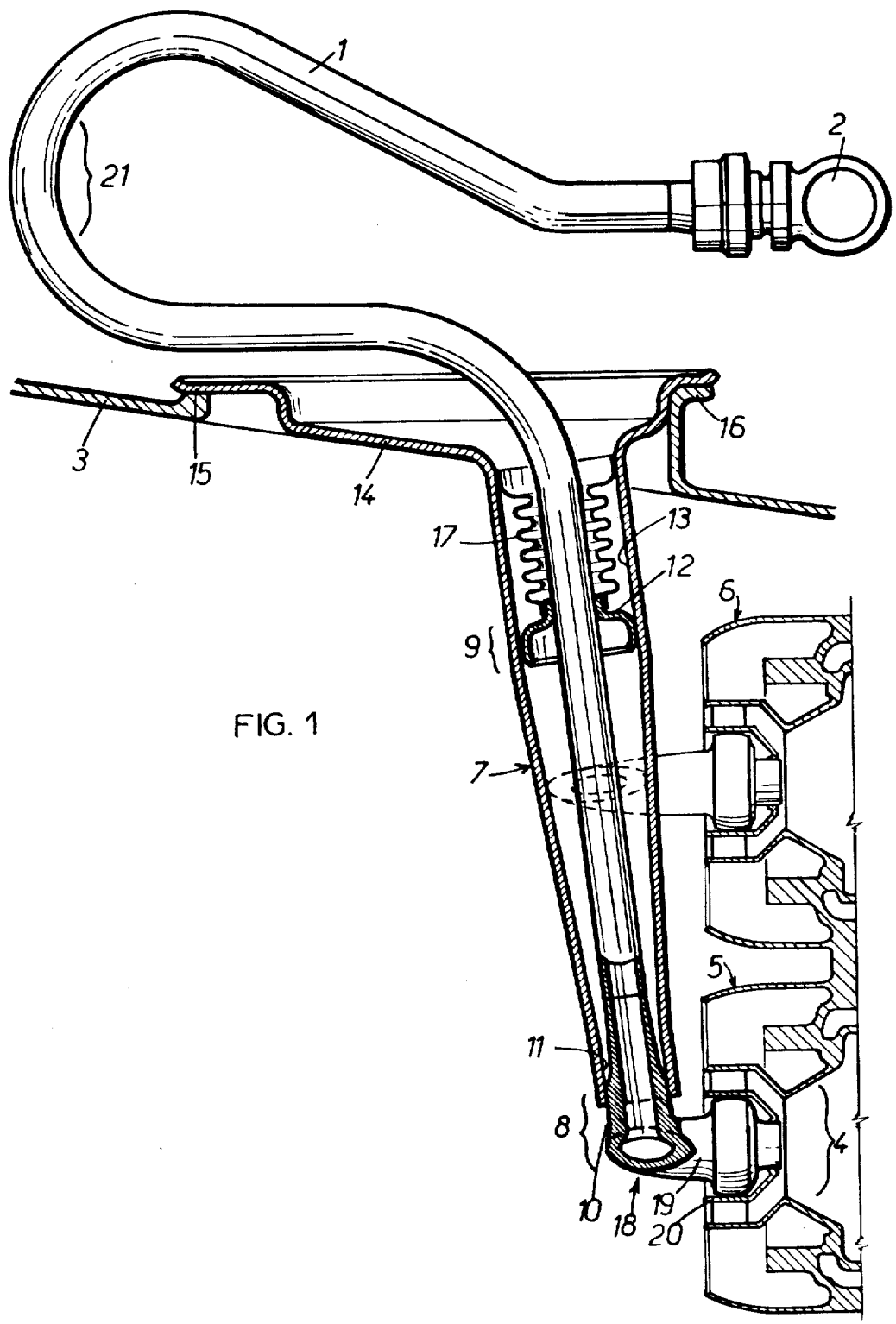
FIG. 1 is a sectional view of one embodiment of an injection device embodying the invention.
Figure 4:
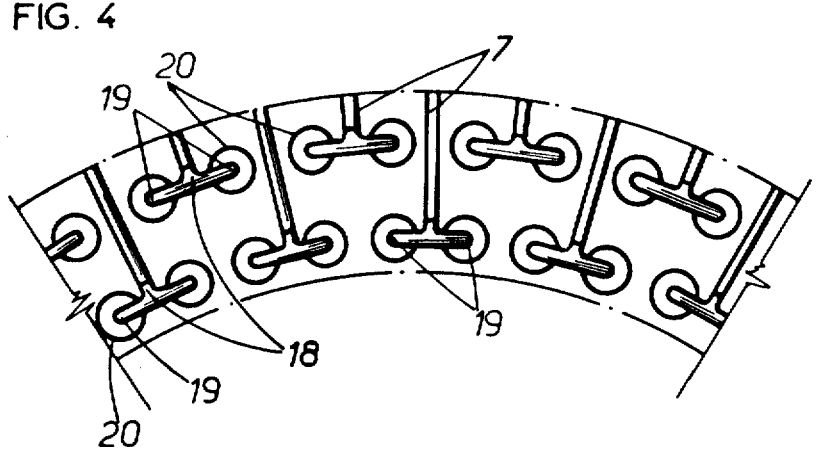
FIG. 4 shows a second example of the distribution of devices supplying two injector heads.

FIG. 1 is a cross section of one embodiment of an injection device according to the invention. A first tube 1 connects the fuel intake manifold 2, arranged on the outside of the engine casing 3, with the injector head 4 mounted on the combustion chamber 5. In this figure, two chambers or part of chambers 5 and 6, superposed and corresponding to the arrangement shown in FIG. 4, are represented; they are used for example for forward chambers being charged and functioning at different instants, corresponding to the engine in the starting or in the cruising phase.

Figure 3:
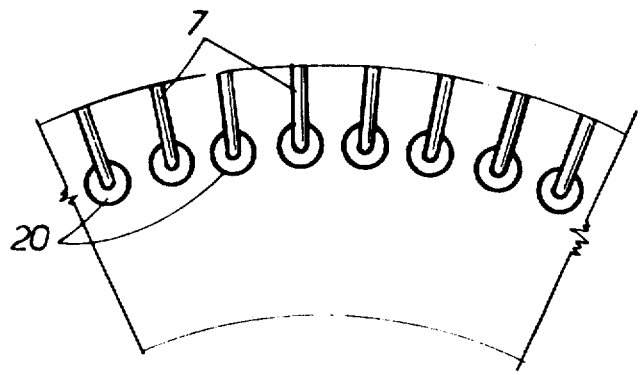
FIG. 3 shows the distribution of the injector devices over annular chambers or disposed in barrels.

Tube 1 is surrounded in an approximately coaxial manner by a second tube 7. The tube 7 covers the tube 1 of the fuel line between the casing 3 and a point close to the injector head. As shown in FIGS. 3 and 4, the coaxial tubes 1 and 7 are arranged radially in the casing and in the path of a jet of air coming from the compression stages located upstream (not shown). They are consequently exposed to aerodynamic forces and to the relatively high temperatures of the compressed air and it is the object of the invention to minimize the effect of this environment.

In order to maintain the relative positions between the two tubes 1 and 7, certain guidance means are provided, said means being represented in the example of FIG. 1 by the two elements 8 and 9. The first element 8 is placed at the free end of the second tube 7 and cooperates with the end of the tube 1 close to the injector head 4. The element 8 is formed by two cooperating cylindrical projections 10 and 11. The projection 10 consists of a cylindrical collar or ferrule at the end of the tube 1 and the projection 11 is formed by the end of the tube 7. The second element 9, placed close to that end of the tube 7 which is secured to the wall of the casing 3, is in the form of a cap 12 placed in the second tube 7 and traversed by the first tube 1. The center part of the cap has a circular orifice wherein the tube 1 is fixed. The rim of the cap, in cooperation with the tube 7, defines a cylindrical part with a diameter such that it makes possible the longitudinal displacement by sliding of the cap 12 on the inner cylindrical part 13 of the tube 7. In order to provide better rigidity of the device and more particularly of the portion passing through the casing, the tube 7 has in its portion close to the casing 3 of a diameter larger than that of its end close to the injector head. According to the embodiment shown, the tube 7 has a simple cylindro-conical configuration or a conical shape terminating at each end in a cylindrical part.

In order to facilitate the attachment of the tube 7 to the casing, its outer end is shaped in the form of a dish 14, with the rim 15 thereof forming a flange whereby it is attached to a corresponding flange 16 provided on the orifice of the casing through which the fuel line 1 passes.

Sealing between the outside of the casing and the jet flow is assured by a sealing element 17 in the form of a bellows. This element is mounted between the first tube 1 and the second tube 7. According to the embodiment shown, it consists of a metal sleeve with an elastic, corrugated wall, fastened at its ends to the internal periphery of the tube 7 and to the cap 12 and more particularly in the vicinity of the central orifice through which the tube 1 passes and to which it is attached.

Tube 1 carries at its end 18 an extension 19 with the end whereof terminating in the injector head 4 centered in the cap 20, that is, integral with the end wall of the chamber 5. Each injection device thus is able to supply one or a plurality of heads (FIGS. 3 and 4).

Each injector head is held in its cap 20 by means of a spherocylindrical element permitting its axial displacement. In order to make possible the displacement of the first tube 1 in the second tube 7, without excessive stress, the tube 1 has in its zone between the fuel intake manifold 2 and the engine casing 3 a part 21 curving in the form of a hairpin or a similar shape, and giving the tube sufficient flexibility to absorb potential relative displacements between the injector head 19 and the manifold 2.

Figure 2:
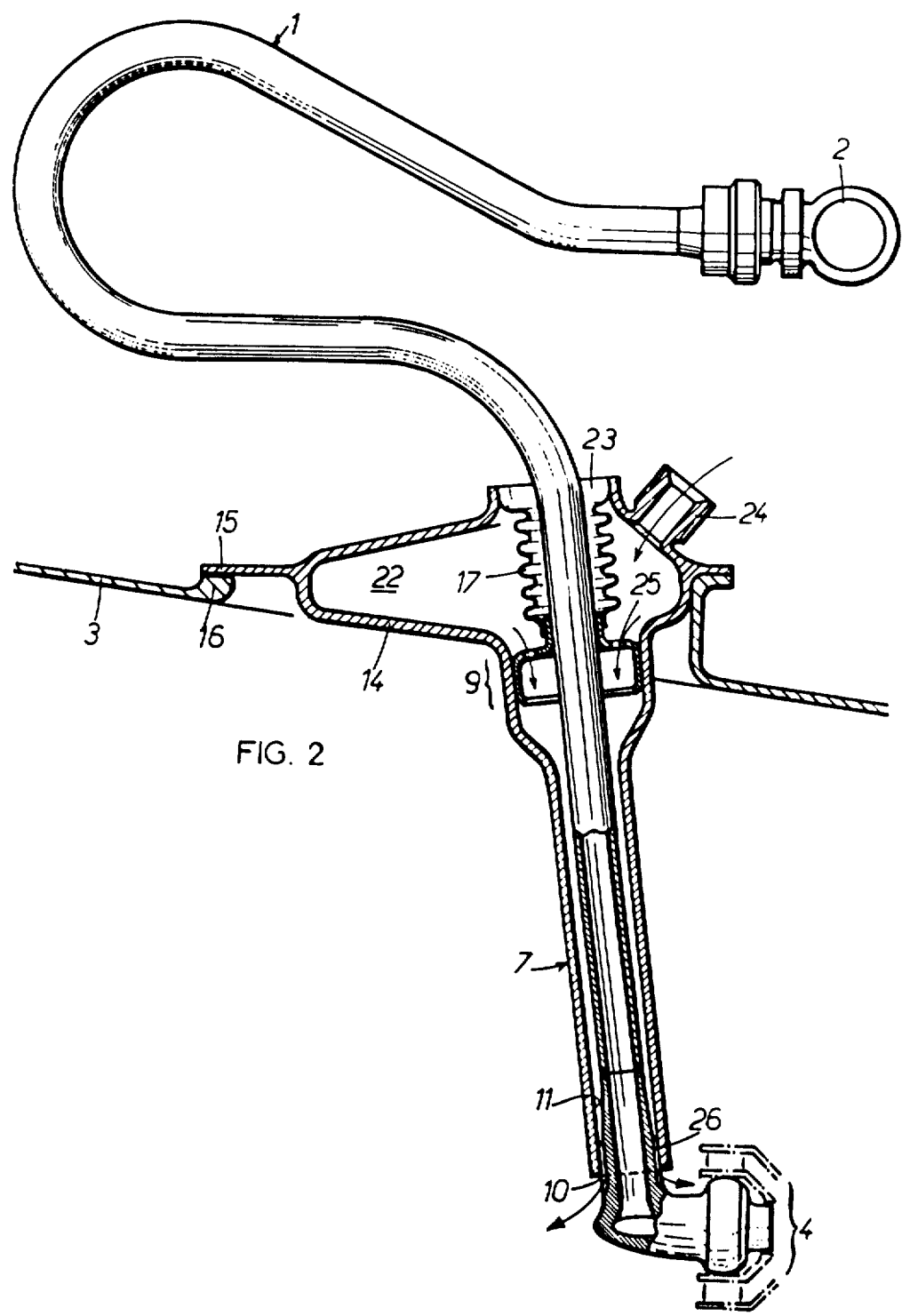
FIG. 2 is a sectional view of a further embodiment of an injector device.

FIG. 2 is another embodiment of an injection device according to the invention.

Elements similar to those in FIG. 1 are identified by the same reference numerals.

The end of the second tube 7, attached to the casing by the flanges 15 and 16, defines a chamber 22 into which two passages 23 and 24 are provided. The fuel line tube 1 traverses the chamber by the first passage 23, the sealing element 17 being secured by one of its ends to the rim of the passage 23 and by its other end to the tube 1 by means of the cap 9. The second passage 24 serves to admit a cooling fluid, generally air taken from the outside, in order to maintain the fuel inlet tube at a sufficiently low temperature and to prevent excessive heating of the fuel. In order to permit the free circulation of the cooling fluid, guidance means, consisting of the cap 9 and the cylindrical projections of the tube 10 and 11, are provided with passages 25 and 26. The fluid, introduced in a region close to the passage through the casing, escapes at the end of tube 7 into the air flow coming from the compressor.

In the example of FIG. 2, the tube 1 supplies a single injector head 4. The arrangement of the devices in the engine may take the configuration shown in FIG. 3.

It is obvious that the device described with reference to FIG. 2, may also be provided with branching for two heads. Such devices may then be arranged, as shown in FIG. 4, in one or a plurality of concentric rings.

Whether devices in conformity with one or the other embodiment of the invention and supplying one or a plurality of heads, are considered, they have numerous common advantages, such as:

the maintenance of the relative position of the injection heads in the combustion chamber, which results in an increase in the performance of the engine, the elimination of hot spots and possibly in a reduction of the thickness of the walls of the combustion chamber. This leads to a gain in weight and a simplification of the cooling;

controlled heating of the fuel as a consequence of the protection afforded by the second tube 7;

the possibility of a cooling circuit that is simple and does not contribute to the complexity of the technology.

The injection devices having several heads have further particular advantages, such as:

a weight and cost advantage by means of the reduction of the bosses, joints, locking bolts, feeder tubes;

a reduction in size by the reduction of the number of injection devices. This results in a more homogeneous supply of air to the combustion chamber and thus in an increased output and a reduction of "hot streaks";

easier maintenance due to the reduction in the number of pieces rendering the assembly and disassembly of the combustion chamber more rapid.

We claim:

1. An injection device for the combustion chamber of a turbine engine and in particular a device linking a fuel intake manifold on the outside of the engine casing with an injector head mounted on the combustion chamber, characterized in that it consists of a first tube connected to the intake manifold and carrying the fuel to the injector head, a second tube approximately coaxial with the first tube and surrounding and spaced from said first tube between the casing and the injector head, one of the ends of the second tube being attached to the casing, said tubes being placed radially in the casing, guidance means arranged between the first and the second tube and including a sealing element comprising a sleeve with elastic, corrugated walls attached by one of its ends to the first tube in the region of the passage of the first tube into the casing, the end of the second tube, attached to the casing, defining a chamber having two passages: a first passage for the first fuel intake tube, with the sealing element being secured between the first tube and the first passage, and a second passage for the admission of a cooling fluid, the guidance means having passages for the cooling fluid, the second tube comprising two parts of different diameters, the part with the larger diameter cooperating with the guidance means in order to allow the longitudinal displacement of said tube, at least one injector head cooperating with a cap integral with the combustion chamber, by means of a projection on said injector head.

2. An injection device according to claim 1 wherein said guidance means comprises a first cylindrical element, arranged at the free end of the second tube and cooperating with the first tube and a second element in the form of a cap surrounding the first tube and attached to one of the tubes.

* * * * *

UNITED STATES PATENT AND TRADEMARK OFFICE
CERTIFICATE OF CORRECTION

PATENT NO. : 4,409,791

DATED : October 18, 1983

INVENTOR(S) : Gerard E.A. Jourdain, and Marcel R. Soligny

It is certified that error appears in the above-identified patent and that said Letters Patent is hereby corrected as shown below:

Title Page: "S.N.E.L.M.A." should be —S.N.E.C.M.A.—

Signed and Sealed this

Twenty-first Day of August 1984

[SEAL]

Attest:

Attesting Officer

GERALD J. MOSSINGHOFF

Commissioner of Patents and Trademarks